US011082356B2

(12) United States Patent
Luo et al.

(10) Patent No.: US 11,082,356 B2
(45) Date of Patent: Aug. 3, 2021

(54) DYNAMIC SCHEDULING METHOD, APPARATUS, AND SYSTEM

(71) Applicant: HUAWEI TECHNOLOGIES CO., LTD., Guangdong (CN)

(72) Inventors: Jingjing Luo, Hong Kong (CN); Wing Shing Wong, Hong Kong (CN); Yong Huang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/721,764

(22) Filed: Dec. 19, 2019

(65) Prior Publication Data

US 2020/0127936 A1     Apr. 23, 2020

Related U.S. Application Data

(63) Continuation of application No. PCT/CN2018/091458, filed on Jun. 15, 2018.

(30) Foreign Application Priority Data

Jun. 20, 2017   (CN) .......................... 201710472003.9

(51) Int. Cl.
*H04L 12/911*     (2013.01)
*H04L 12/863*     (2013.01)

(52) U.S. Cl.
CPC .............. *H04L 47/70* (2013.01); *H04L 47/50* (2013.01)

(58) Field of Classification Search
CPC ..... H04L 47/70; H04L 47/50; H04L 49/3027; H04L 47/522; H04L 29/08; H04L 67/2842
See application file for complete search history.

(56) References Cited

U.S. PATENT DOCUMENTS 8,767,752 B1     7/2014  Tripathi et al.
2004/0090974 A1* 5/2004  Balakrishnan ........ H04L 49/254
                                                     370/412

(Continued)

FOREIGN PATENT DOCUMENTS

CN     101626347 A    1/2010
CN     103546337 A    1/2014
WO     2016138823 A1  9/2016

OTHER PUBLICATIONS

A. Hopps, "Analysis of an Equal-Cost Multi-Path Algorithm," RFC 2992, IETF, 2000. total 8 pages.

(Continued)

*Primary Examiner* — Michael A Keller
(74) *Attorney, Agent, or Firm* — Womble Bond Dickinson (US) LLP

(57) ABSTRACT

Embodiments of this application relate to the field of communications technologies, and disclose a dynamic scheduling method, an apparatus, and a system, so as to reduce information exchange costs and calculation complexity of data scheduling and route allocation. The method includes: receiving, by a scheduling platform, first VOQ length information of each aggregation switch in each timeslot; aggregating all the received first VOQ length information, to obtain global VOQ length information, where the global VOQ length information includes a total quantity of data packets that need to be sent from each of M pods to other pods than the pod; determining a transmission matching scheme based on the global VOQ length information; and sending corresponding matching result information to each aggregation switch according to the transmission matching scheme, so that each aggregation switch sends a data packet according to the transmission matching scheme.

11 Claims, 7 Drawing Sheets

(56) References Cited

U.S. PATENT DOCUMENTS

| | | | | |
|---|---|---|---|---|
| 2005/0152352 | A1* | 7/2005 | Jun | H04L 47/527 370/388 |
| 2007/0237074 | A1* | 10/2007 | Curry | H04L 47/29 370/229 |
| 2008/0175259 | A1* | 7/2008 | Chao | H04L 49/101 370/413 |
| 2009/0279560 | A1* | 11/2009 | Jones | H04L 47/263 370/413 |
| 2014/0161135 | A1* | 6/2014 | Acharya | H04L 47/6255 370/412 |
| 2016/0087892 | A1* | 3/2016 | Janakiraman | H04L 12/462 370/392 |
| 2016/0134954 | A1* | 5/2016 | Yang | H04L 12/4625 398/45 |
| 2017/0005951 | A1* | 1/2017 | Labonte | H04L 47/6225 |
| 2017/0155600 | A1* | 6/2017 | Tripathi | H04L 45/7457 |

OTHER PUBLICATIONS

J. Perry, A. Ousterhout, A. Ousterhout, D. Shah and H. Fugal, "Fastpass: A Centralized "Zero-Queue" Datacenter Network," SIGCOMM'14, Aug. 17-22, 2014, Chicago, IL, USA. Total 12 pages.

M. Al-Fares et al. "A Scalable, Commodity Data Center Network Architecture," SIGCOMM'08, Aug. 17-22, 2008, Seattle, Washington, USA. pp. 63-74.

Imran Muhammad et al: "Software-defined optical burst switching for HPC and cloud computing data centers", Journal of Optical Communications and Networking, Institute of Electrical and Electronics Engineers, US, vol. 8, No. 8, Aug. 1, 2016 (Aug. 1, 2016), pp. 610-620, XP011619306.

* cited by examiner

DYNAMIC SCHEDULING METHOD, APPARATUS, AND SYSTEM

CROSS-REFERENCE TO RELATED APPLICATIONS

This application is a continuation of International Application No. PCT/CN2018/091458, filed on Jun. 15, 2018, which claims priority to Chinese Patent Application No. 201710472003.9, filed on Jun. 20, 2017. The disclosures of the aforementioned applications are herein incorporated by reference in their entireties.

TECHNICAL FIELD

Embodiments of the application relate to the field of communications technologies, and in particular, to a dynamic scheduling method, apparatus, and system.

BACKGROUND

With vigorous development of the Internet industry, a data center network continuously expands in scale, and how to effectively reduce complexity of data scheduling and route allocation is a hot issue concerned in current academic and industrial circles and also becomes increasingly challenging.

A currently used scheduling technology is a fastpass technology. In a specific solution of the fastpass technology, a center scheduler is disposed in a data center network, and the center scheduler is used to control all data scheduling and route allocation in the data center network. By analyzing data request information from all hosts, the center scheduler performs the following operations: (1) timeslot assignment: In each timeslot, a greedy algorithm is used to match source hosts with target hosts until any pair of source host and target host cannot be added, so that matching is performed to the greatest extent. In this solution, one host transmits data with a maximum of one host in one timeslot; and (2) path selection: A route is selected, by using a bipartite-graph-based edge coloring algorithm, for a data packet that arrives at a switch, so as to ensure no conflict during data packet transmission.

However, when scheduling is performed by using the fastpass technology, the center scheduler is needed to collect data request information from all the hosts in each timeslot, and completes, based on a huge amount of collected data request information, host-to-host transmission pairing and a calculation task assigned in global routing. Therefore, information exchange costs of the center scheduler are relatively high, and calculation complexity of data scheduling and route allocation is relatively high.

SUMMARY

Embodiments of the application provide a dynamic scheduling method, an apparatus, and a system, so as to reduce information exchange costs and calculation complexity of data scheduling and route allocation.

According to a first aspect, this application provides a dynamic scheduling method. The method includes: receiving, by a scheduling platform, first virtual output queue (VOQ) length information of each aggregation switch in each timeslot, where the first VOQ length information includes a quantity of data packets buffered in M-1 VOQs in the aggregation switch, each of the M-1 VOQs is used to buffer a data packet that needs to be sent from a first cluster pod to one of M-1 second pods, the first pod is a pod to which the aggregation switch belongs, the M-1 second pods are other pods than the first pod in M pods managed by the scheduling platform, M≥2, and M is an integer; aggregating, by the scheduling platform, all the received first VOQ length information, to obtain global VOQ length information, where the global VOQ length information includes a total quantity of data packets that need to be sent from each of the M pods to other pods than the pod in the M pods; determining, by the scheduling platform, a transmission matching scheme based on the global VOQ length information, where the transmission matching scheme is used to instruct each pod to: send a data packet to one of the M pods except the pod and receive a data packet sent by one of the M pods except the pod; and sending, by the scheduling platform, corresponding matching result information to each aggregation switch according to the transmission matching scheme, so that each aggregation switch sends a data packet according to the transmission matching scheme.

According to the dynamic scheduling method provided in this application, the scheduling platform only needs to collect, in each timeslot, a quantity of data packets that are buffered in an aggregation switch in each pod and that need to be sent from the pod to another pod, and then determine a transmission matching scheme in which each pod can send a data packet to one of the M pods except the pod and receive a data packet sent by one of the M pods except the pod. Because one pod may be connected to a plurality of hosts, compared with a prior-art solution of collecting data request information of each host and calculating host-to-host transmission pairing and global route allocation, the dynamic scheduling method provided in this application can greatly reduce information exchange costs and calculation complexity of data scheduling and route allocation.

In one embodiment, the aggregating, by the scheduling platform, all the received first VOQ length information, to obtain global VOQ length information includes: aggregating, by the scheduling platform, first VOQ length information of aggregation switches in each pod, to obtain M pieces of second VOQ length information that are in a one-to-one correspondence with the M pods, where the second VOQ length information includes a total quantity of data packets that are buffered in all aggregation switches in a corresponding pod in a current timeslot and that need to be sent from the corresponding pod to other pods than the corresponding pod in the M pods; and aggregating, by the scheduling platform, the M pieces of second VOQ length information, to obtain the global VOQ length information.

In one embodiment, the determining, by the scheduling platform, a transmission matching scheme based on the global VOQ length information includes: converting, by the scheduling platform, the global VOQ length information into weighted bipartite graph information; and obtaining, by the scheduling platform, the transmission matching scheme by using a maximum weighted matching algorithm based on the weighted bipartite graph information.

In this embodiment, a transmission matching scheme can be adjusted in real time based on an overstocking status of a data packet by using a maximum weighted matching algorithm for a weighted bipartite graph, so as to more properly allocate link resources, thereby effectively improving network bandwidth usage and reducing an intra-network delay.

In one embodiment, the sending, by the scheduling platform, corresponding matching result information to each aggregation switch according to the transmission matching scheme includes: generating, by the scheduling platform according to the transmission matching scheme, the matching result information corresponding to each aggregation switch; and sending, by the scheduling platform, the corresponding matching result information to each aggregation switch.

According to a second aspect, this application provides a scheduling method. The method includes: determining, by an aggregation switch, first virtual output queue VOQ length information in each timeslot, where the first VOQ length information includes a quantity of data packets buffered in M-1 VOQs in the aggregation switch, each of the M-1 VOQs is used to buffer a data packet that needs to be sent from a first pod to one of M-1 second pods, the first pod is a pod to which the aggregation switch belongs, the M-1 second pods are other pods than the first pod in M pods managed by a scheduling platform, M≥2, and M is an integer; sending, by the aggregation switch, the first VOQ length information to the scheduling platform; receiving, by the aggregation switch, matching result information sent by the scheduling platform, where the matching result information is used to instruct the aggregation switch to send a first data packet, the first data packet is a data packet that needs to be sent from the first pod to a third pod, and the third pod is one of the other pods; and sending, by the aggregation switch, the first data packet based on the matching result information.

According to the dynamic scheduling method provided in this application, the aggregation switch sends the first VOQ length information to the scheduling platform, so that the scheduling platform can determine the quantity of data packets buffered in the M-1 VOQs in the aggregation switch. The scheduling platform only needs to collect, in each timeslot, a quantity of data packets that are buffered in an aggregation switch in each pod and that need to be sent from the pod to another pod, and then determine a transmission matching scheme in which each pod can send a data packet to one of the M pods except the pod and receive a data packet sent by one of the M pods except the pod. Because one pod may be connected to a plurality of hosts, compared with a prior-art solution of collecting data request information of each host and calculating host-to-host transmission pairing and global route allocation, the dynamic scheduling method provided in this application can greatly reduce information exchange costs and calculation complexity of data scheduling and route allocation.

In one embodiment, the aggregation switch is connected to n/2 core switches, n≥2, n is an integer, a quantity of first data packets is N, and the sending, by the aggregation switch, the first data packet based on the matching result information includes: when N≤n/2, simultaneously sending, by the aggregation switch, the N first data packets in a current timeslot based on the matching result information; or when N≥n/2, simultaneously sending, by the aggregation switch, n/2 of the first data packets in a current timeslot based on the matching result information.

In one embodiment, the aggregation switch is connected to n/2 core switches, n≥2, n is an integer, a quantity of first data packets is N, and the sending, by the aggregation switch, the first data packet based on the matching result information includes: when N≤n/2, simultaneously sending, by the aggregation switch, the N first data packets in a next timeslot based on the matching result information; or when N≥n/2, simultaneously sending, by the aggregation switch, n/2 of the first data packets in a next timeslot based on the matching result information.

According to a third aspect, this application provides a scheduling platform, including: a receiving unit, configured to receive first virtual output queue VOQ length information of each aggregation switch in each timeslot, where the first VOQ length information includes a quantity of data packets buffered in M-1 VOQs in the aggregation switch, each of the M-1 VOQs is used to buffer a data packet that needs to be sent from a first pod to one of M-1 second pods, the first pod is a pod to which the aggregation switch belongs, the M-1 second pods are other pods than the first pod in M pods managed by the scheduling platform, M≥2, and M is an integer; a processing unit, configured to aggregate all the first VOQ length information received by the receiving unit, to obtain global VOQ length information, where the global VOQ length information includes a total quantity of data packets that need to be sent from each of the M pods to other pods than the pod in the M pods; where the processing unit is further configured to determine a transmission matching scheme based on the global VOQ length information, where the transmission matching scheme is used to instruct each pod to: send a data packet to one of the M pods except the pod and receive a data packet sent by one of the M pods except the pod; and a sending unit, configured to send corresponding matching result information to each aggregation switch according to the transmission matching scheme determined by the processing unit, so that each aggregation switch sends a data packet according to the transmission matching scheme.

In one embodiment, the processing unit includes a first processing module and M second processing modules that are in a one-to-one correspondence with the M pods; and that the processing unit is configured to aggregate all the received first VOQ length information, to obtain global VOQ length information specifically includes: each of the M second processing modules is configured to: aggregate first VOQ length information of all aggregation switches in a corresponding pod, to obtain second VOQ length information, and send the second VOQ length information to the first processing module, where the second VOQ length information includes a total quantity of data packets that are buffered in all the aggregation switches in a current timeslot and that need to be sent from the corresponding pod to other pods than the corresponding pod in the M pods; and the first processing module is configured to aggregate M pieces of second VOQ length information obtained by the M second processing modules, to obtain the global VOQ length information.

In one embodiment, the processing unit is specifically configured to: convert, by the first processing module, the global VOQ length information into weighted bipartite graph information; and obtain, by the scheduling platform, the transmission matching scheme by using a maximum weighted matching algorithm based on the weighted bipartite graph information.

In one embodiment, the sending unit is specifically configured to: generate, according to the transmission matching scheme, the matching result information corresponding to each aggregation switch; and send the corresponding matching result information to each aggregation switch.

For technical effects of the scheduling platform provided in this application, refer to technical effects of the first aspect or the implementations of the first aspect. Details are not described herein again.

According to a fourth aspect, this application provides an aggregation switch, including: a processing unit, configured to determine first virtual output queue VOQ length information in each timeslot, where the first VOQ length information includes a quantity of data packets buffered in M-1 VOQs in the aggregation switch, each of the M-1 VOQs is used to buffer a data packet that needs to be sent from a first pod to one of M-1 second pods, the first pod is a pod to which the aggregation switch belongs, the M-1 second pods are other pods than the first pod in M pods managed by the scheduling platform, M≥2, and M is an integer; a sending unit, configured to send the first VOQ length information determined by the processing unit to the scheduling platform; and a receiving unit, configured to receive matching result information sent by the scheduling platform, where the matching result information is used to instruct the aggregation switch to send a first data packet, the first data packet is a data packet that needs to be sent from the first pod to a third pod, and the third pod is one of the other pods; where the sending unit is configured to send the first data packet based on the matching result information received by the receiving unit.

In one embodiment, the aggregation switch is connected to n/2 core switches, n≥2, n is an integer, a quantity of first data packets is N, and the sending unit is specifically configured to: when N≤n/2, simultaneously send the N first data packets in a current timeslot based on the matching result information; or when N≥n/2, simultaneously send n/2 of the first data packets in a current timeslot based on the matching result information.

In one embodiment, the aggregation switch is connected to n/2 core switches, n≥2, n is an integer, a quantity of first data packets is N, and the sending unit is specifically configured to: when N≤n/2, simultaneously send the N first data packets in a next timeslot based on the matching result information; or when N≥n/2, simultaneously send n/2 of the first data packets in a next timeslot based on the matching result information.

For technical effects of the aggregation switch provided in this application, refer to the technical effects of the second aspect or the implementations of the second aspect. Details are not described herein again.

According to a fifth aspect, this application further provides a scheduling platform, including a processor, a memory, and a transceiver, and the processor may execute a program or an instruction stored in the memory, so as to implement the dynamic scheduling method according to the implementations of the first aspect.

For technical effects of the scheduling platform provided in this application, refer to technical effects of the first aspect or the implementations of the first aspect. Details are not described herein again.

According to a sixth aspect, this application further provides an aggregation switch, including a processor, a memory, and a transceiver, and the processor may execute a program or an instruction stored in the memory, so as to implement the dynamic scheduling method according to the implementations of the second aspect.

For technical effects of the aggregation switch provided in this application, refer to the technical effects of the second aspect or the implementations of the second aspect. Details are not described herein again.

According to a seventh aspect, this application further provides a computer readable storage medium. The computer storage medium may store a program, and when the program is executed, some or all of the operations in embodiments of the dynamic scheduling method provided in this application may be performed.

According to an eighth aspect, this application further provides a communications system, including the scheduling platform according to the third aspect or any implementation of the third aspect, and the aggregation switch according to the fourth aspect or any implementation of the fourth aspect; or including the scheduling platform according to the fifth aspect or any implementation of the fifth aspect, and the aggregation switch according to the sixth aspect or any implementation of the sixth aspect.

DESCRIPTION OF EMBODIMENTS

Figure 1A:
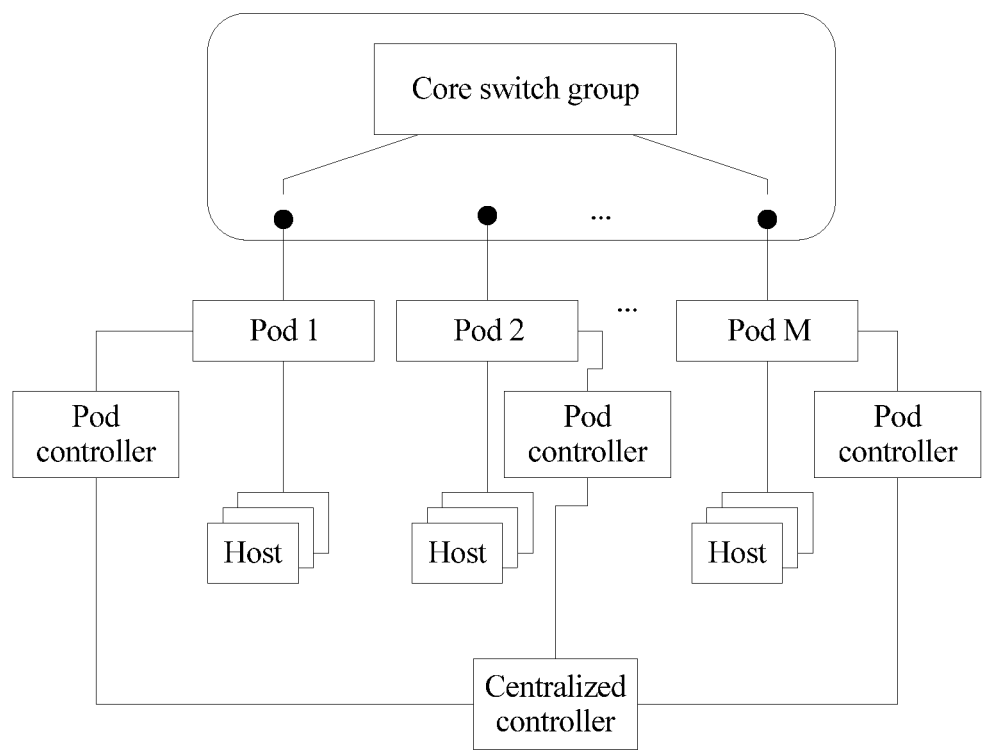
FIG. 1A is a schematic structural diagram of a communications system according to this application.

A dynamic scheduling method according to this application is applicable to a communications system including a plurality of clusters (pod). FIG. 1A is a block diagram of a communications system according to this application, and the communications system includes a core switch group, M (M≥2, and M is an integer) pods, a plurality of hosts connected to each pod, and a scheduling platform.

Each of the M pods includes a plurality of aggregation switches and a plurality of edge switches.

The scheduling platform may be a control system deployed independently of each pod, is connected to each aggregation switch, collects data buffer information of each aggregation switch, and controls, through centralized scheduling, each aggregation switch to forward data. Alternatively, as shown in FIG. 1A, the scheduling platform may include two parts: a pod controller corresponding to each pod and a centralized controller. The pod controller is connected to each aggregation switch in a pod to which the pod controller belongs, and is configured to: collect data buffer information of each aggregation switch in the pod, and then send the collected information to the centralized controller. The centralized controller determines a scheduling scheme based on information sent by each pod, and controls each pod controller to notify each aggregation switch of the determined transmission scheme, so that each aggregation switch transmits data according to the scheduling scheme.

In this application, the communications system may be a communications system based on an n-ary fat-tree switching network, where n indicates that each switch (including an edge switch, an aggregation switch, and a core switch) in the fat-tree switching network has n ports, and one n-ary fat-tree system may include n pods. One pod includes n/2 aggregation switches and n/2 edge switches. Herein, n/2 ports of each aggregation switch are respectively connected to n/2 core switches, and the other n/2 ports are respectively connected to the n/2 edge switches in the pod. Herein, n/2 ports of each edge switch are respectively connected to the n/2 aggregation switches in the pod, and the other n/2 ports are respectively connected to n/2 hosts. Each aggregation switch in the pod is connected to the n/2 core switches, and therefore one pod is connected to $(n/2)^2$ core switches.

Figure 1B:
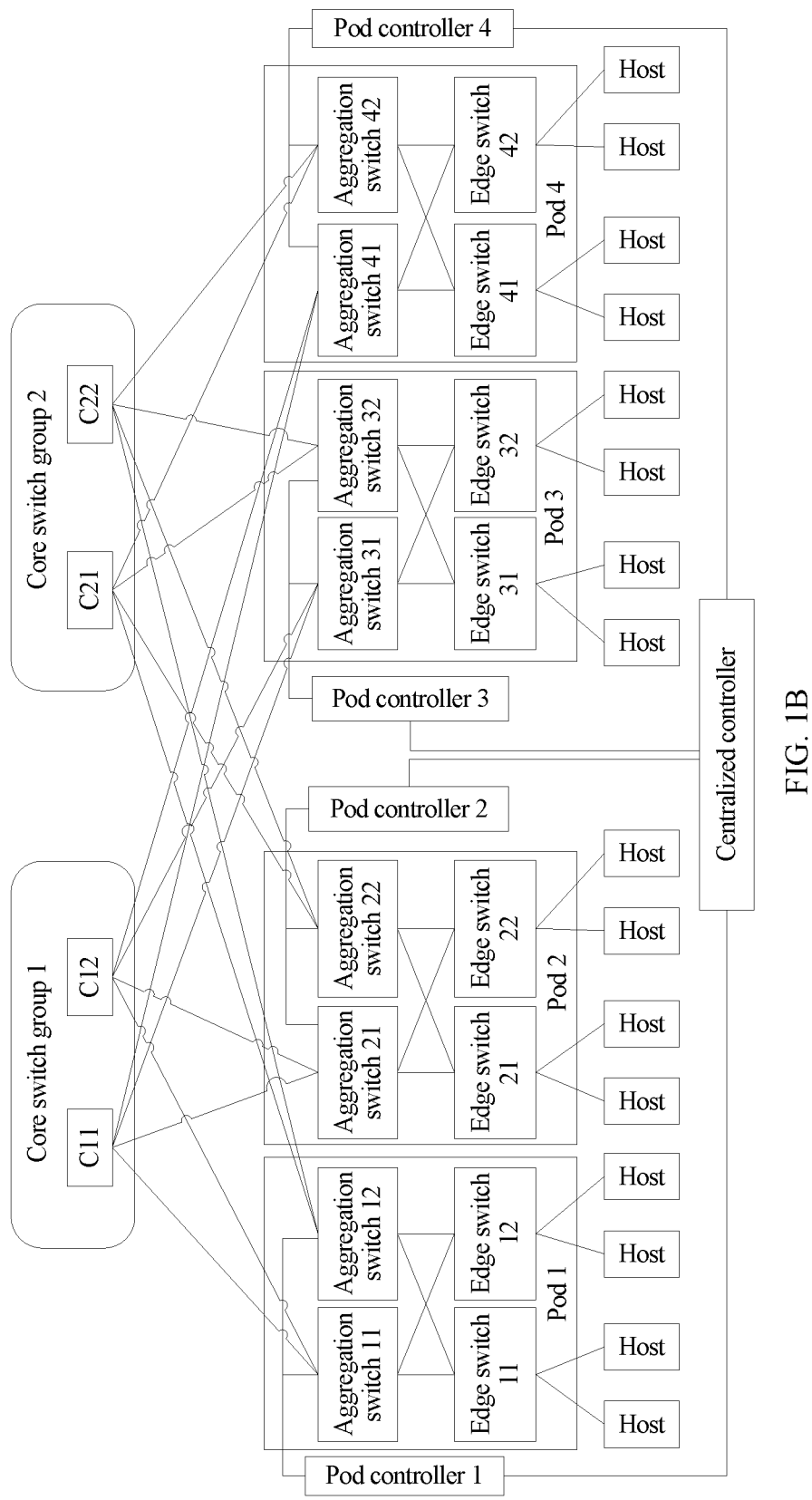
FIG. 1B is a schematic structural diagram of another communications system according to this application.

For example, if n=4, based on a quaternary fat-tree switching network, a specific form of the communications system shown in FIG. 1A may be shown in FIG. 1B. The communications system includes a core switch group 1, a core switch group 2, a pod 1, a pod 2, a pod 3, a pod 4, a scheduling platform, and 16 hosts. The core switch group 1 includes two core switches (C11 and C12 shown in FIG. 1B), and the core switch group 2 includes two core switches (C21 and C22 shown in FIG. 1B). The scheduling platform includes a pod controller 1, a pod controller 2, a pod controller 3, a pod controller 4, and a centralized controller.

The pod 1 includes an aggregation switch 11, an aggregation switch 12, an edge switch 11, and an edge switch 12. The pod controller 1 is connected to the centralized controller, the aggregation switch 11, and the aggregation switch 12. Two ports of the aggregation switch 11 are respectively connected to C11 and C12, and the other two ports are respectively connected to the edge switch 11 and the edge switch 12. Two ports of the aggregation switch 12 are respectively connected to C21 and C22, and the other two ports are respectively connected to the edge switch 11 and the edge switch 12. The other two ports of the edge switch 11 are respectively connected to two hosts, and the other two ports of the edge switch 12 are respectively connected to two other hosts.

The pod 2 includes an aggregation switch 21, an aggregation switch 22, an edge switch 21, and an edge switch 22. The pod controller 2 is connected to the centralized controller, the aggregation switch 21, and the aggregation switch 22. Two ports of the aggregation switch 21 are respectively connected to C11 and C12, and the other two ports are respectively connected to the edge switch 21 and the edge switch 22. Two ports of the aggregation switch 22 are respectively connected to C21 and C22, and the other two ports are respectively connected to the edge switch 21 and the edge switch 22. The other two ports of the edge switch 21 are respectively connected to two hosts, and the other two ports of the edge switch 22 are respectively connected to two other hosts.

The pod 3 includes an aggregation switch 31, an aggregation switch 32, an edge switch 31, and an edge switch 32. The pod controller 3 is connected to the centralized controller, the aggregation switch 31, and the aggregation switch 32. Two ports of the aggregation switch 31 are respectively connected to C11 and C12, and the other two ports are respectively connected to the edge switch 31 and the edge switch 32. Two ports of the aggregation switch 32 are respectively connected to C21 and C22, and the other two ports are respectively connected to the edge switch 31 and the edge switch 32. The other two ports of the edge switch 31 are respectively connected to two hosts, and the other two ports of the edge switch 32 are respectively connected to two other hosts.

The pod 4 includes an aggregation switch 41, an aggregation switch 42, an edge switch 41, and an edge switch 42. The pod controller 4 is connected to the centralized controller, the aggregation switch 41, and the aggregation switch 42. Two ports of the aggregation switch 41 are respectively connected to C11 and C12, and the other two ports are respectively connected to the edge switch 41 and the edge switch 42. Two ports of the aggregation switch 42 are respectively connected to C21 and C22, and the other two ports are respectively connected to the edge switch 41 and the edge switch 42. The other two ports of the edge switch 41 are respectively connected to two hosts, and the other two ports of the edge switch 42 are respectively connected to two other hosts.

It should be noted that, in addition to the n-ary fat-tree switching network, the communications system provided in this application may be based on other network structures, which are not exhaustively listed herein.

Figure 2:
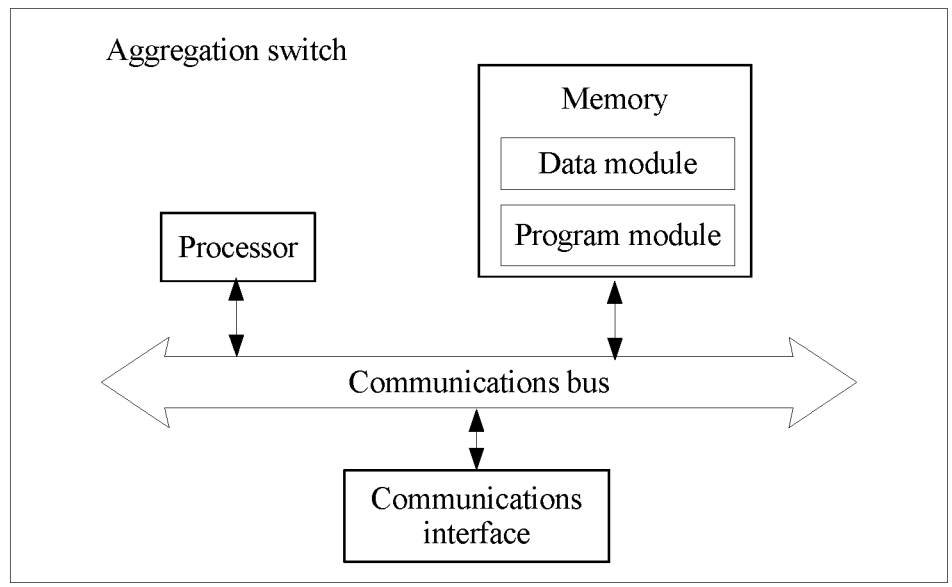
FIG. 2 is a first schematic structural diagram of an aggregation switch according to this application.

For example, FIG. 2 is a schematic structural diagram of hardware of an aggregation switch according to this application, and the aggregation switch includes a processor, a memory, a communications interface, and the like.

The processor is a control center of the aggregation switch, and connects all components of the entire aggregation switch by using various interfaces and lines. By running or executing an application program and/or an operating system stored in the memory and by invoking data stored in the memory, the processor performs various functions of the aggregation switch and processes data, to monitor the aggregation switch overall. The processor may include a digital signal processor device, a microprocessor device, an analog-to-digital converter, a digital-to-analog converter, and the like, and control and signal processing functions of the aggregation switch can be allocated to these devices based on capabilities of these devices. The communications interface may be configured to receive and send information, and send the received information to the processor for processing.

Figure 3:
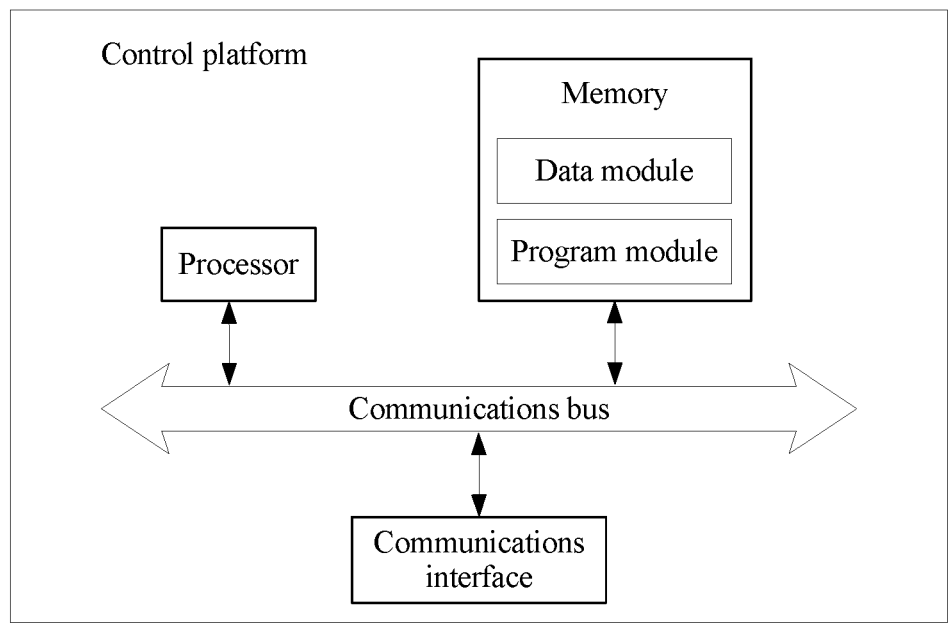
FIG. 3 is a first schematic structural diagram of a scheduling platform according to this application.

For example, FIG. 3 is a schematic structural diagram of hardware of a scheduling platform according to this application, and the scheduling platform may include a memory, a processor, a bus, and a communications interface.

The bus is configured to connect the processor, the memory, and the communications interface, and transmit data between the processor, the memory, and the communications interface. The processor receives a command from the communications interface by using the bus, decrypts the received command, makes a calculation or processes data according to the decrypted command, and sends processed data from the communications interface to another device by using the bus. The memory includes a program module, a data module, and the like. The program module may include software, firmware, hardware, or at least two of the software, the firmware, and the hardware, and is configured to store an application program and an operating system. The communications interface is configured to connect the scheduling platform and the aggregation switch in the pod, so as to exchange information between the scheduling platform and the pod.

It should be noted that a timeslot used in this application is a time period for transmitting a data packet of a size of a maximum transmission unit (MTU).

Figure 4:
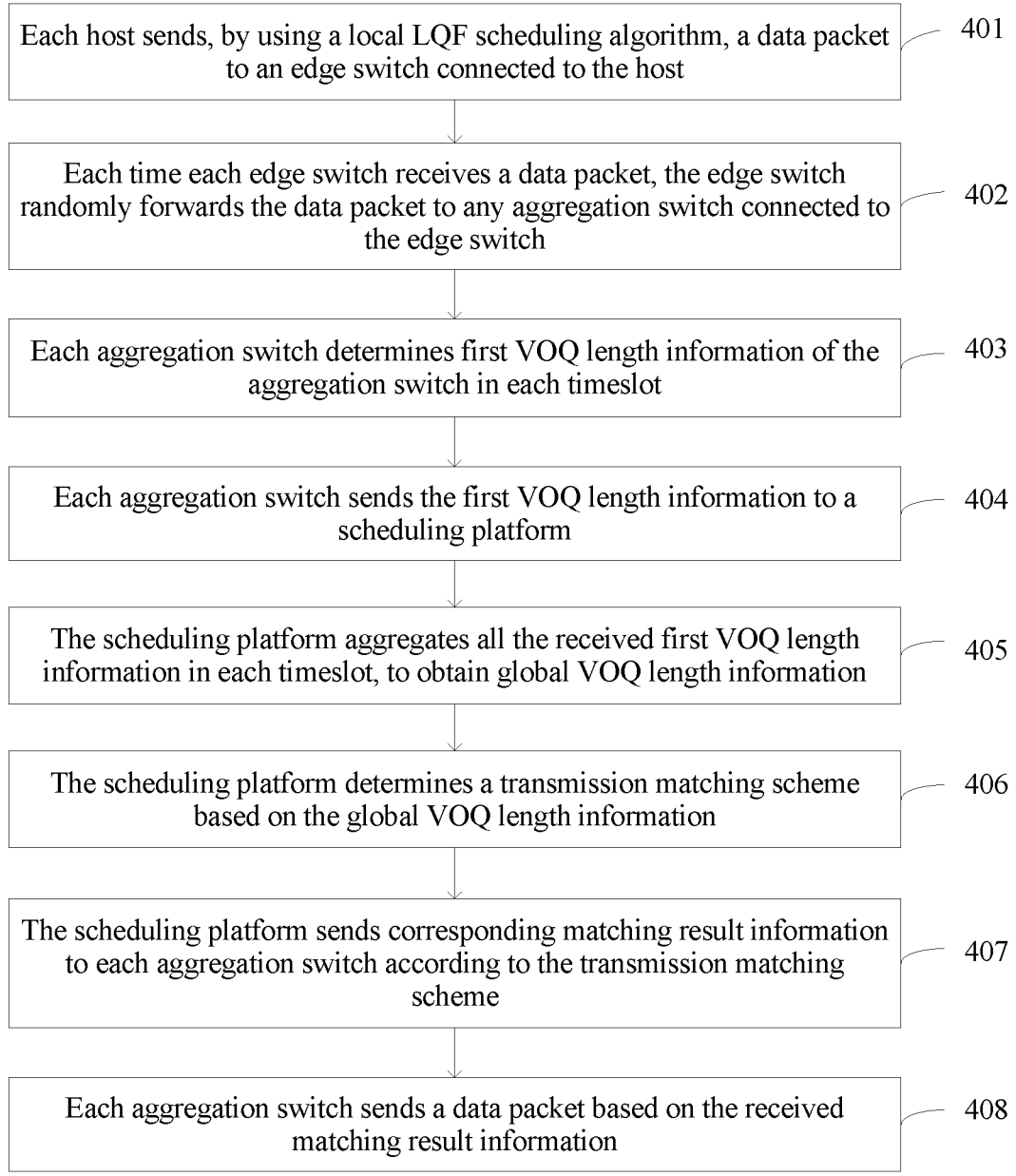
FIG. 4 is a flowchart of an embodiment of a dynamic scheduling method according to this application.

Based on the communications system shown in FIG. 1B, FIG. 4 is a flowchart of an embodiment of a dynamic scheduling method according to this application. The method includes the following operations.

In operation 401, each host sends, by using a local longest queue first (LQF) scheduling algorithm, a data packet to an edge switch connected to the host.

It should be noted that in this application, m VOQs are configured in each host. The m VOQs are respectively used to buffer data packets that are sent by the host to m other hosts in a network.

For example, an $i^{th}$ host (a host i) in the system is used as an example. It is assumed that a VOQ that is in the host i and that is used to buffer a data packet sent by the host i to a host j (indicating a $i^{th}$ host in the system) is indicated as a VOQ The data packet enters and exits the $VOQ_{ij}$ according to a first in first out (FIFO) rule. The data packet buffered in the $VOQ_{ij}$ is a data packet that is buffered in the $VOQ_{ij}$ first and output from the $VOQ_{ij}$ first.

In this application, the host i is allowed to output one data packet to the system in each timeslot, in other words, sends one data packet to an edge switch connected to the host i. Therefore, a host-to-host data flow mode is as follows: Any data flow meeting conditions $$\sum_{i=0}^{\frac{n^3}{4}-1} \lambda_{ij} < 1 \text{ and } \sum_{j=0}^{\frac{n^3}{4}-1} \lambda_{ij} < 1$$

is allowed, where $\lambda_{ij}<1$ indicates an arrival rate of a data packet from the host i to the host j;

$$\sum_{i=0}^{\frac{n^3}{4}-1} \lambda_{ij} < 1$$

indicates that for the host j, a sum of transmission rates of data sent by all hosts except the host j to the host j in the system is not greater than 1; and $$\sum_{j=0}^{\frac{n^3}{4}-1} \lambda_{ij} < 1$$

indicates that for the host i, a sum of transmission rates of data sent by the host i to all hosts except the host i in the system is not greater than 1.

The foregoing data flow mode may be used to avoid a case in which a transmission path in the system is blocked because a transmission rate of a data packet that is input from each host to the system is much higher than a forwarding rate of a data packet in the system, thereby ensuring system stability.

In this application, each host uses a local LQF scheduling algorithm to select, from the m VOQs, a VOQ with a longest queue length (in other words, with a maximum quantity of buffered data packets) for serving. If a queue length of the VOQ with the longest queue length is greater than 1, a data packet is output from a queue head of the VOQ, and is transmitted to an edge switch connected to the host. If a queue length of the VOQ with the longest queue length is less than 1 (in other words, no data packet is buffered in the VOQ), no operation is performed on the VOQ.

In operation 402, each time each edge switch receives a data packet, the edge switch randomly forwards the data packet to any aggregation switch connected to the edge switch.

For example, the edge switch 11 in the pod 1 in FIG. 1B is used as an example. Two ports of the edge switch 11 are respectively connected to the aggregation switch 11 and the aggregation switch 12 in the pod 1. Each time the edge switch 11 receives a data packet, the edge switch 11 may randomly select a port connected to an aggregation switch to output the data packet, to randomly forward the data packet to the aggregation switch 11 or the aggregation switch 12.

In operation 403, each aggregation switch determines first VOQ length information of the aggregation switch in each timeslot.

In this application, M-1 VOQs are configured in each aggregation switch in the system. An aggregation switch is used as an example. Each of the M-1 VOQs in the aggregation switch is used to buffer a data packet that needs to be sent from a first pod to one of M-1 second pods, the first pod is a pod to which the aggregation switch belongs, and the M-1 second pods are other pods than the first pod in M pods managed by the scheduling platform.

A data packet sent from one pod to another pod in this application is a data packet sent from a host connected to one pod to a host connected to another pod.

For example, for the aggregation switch 11 and the aggregation switch 12 shown in FIG. 1B, the pod 1 is a first pod, and the pod 2, the pod 3, and the pod 4 are second pods. Three VOQs configured in the aggregation switch 11 are a $VOQ_{1112}$, a $VOQ_{1113}$, and a $VOQ_{1114}$. The $VOQ_{1112}$ used to buffer a data packet that needs to be sent from the pod 1 to the pod 2; the $VOQ_{1113}$ is used to buffer a data packet that needs to be sent from the pod 1 to the pod 3; and the $VOQ_{1114}$ is used to buffer a data packet that needs to be sent from the pod 1 to the pod 4.

Three VOQs configured in the aggregation switch 12 are a $VOQ_{1212}$ a $VOQ_{1213}$, and a $VOQ_{1214}$. The $VOQ_{1212}$ is used to buffer a data packet that needs to be sent from the pod 1 to the pod 2; the $VOQ_{1213}$ is used to buffer a data packet that needs to be sent from the pod 1 to the pod 3; and the $VOQ_{1214}$ is used to buffer a data packet that needs to be sent from the pod 1 to the pod 4.

It may be understood that both the aggregation switch 11 and the aggregation switch 12 may buffer data packets that need to be sent from the pod 1 to the pod 2, the pod 3, and/or the pod 4.

In each timeslot, each aggregation switch needs to check or detect a buffer status of a data packet in each VOQ in the aggregation switch, to determine first VOQ length information. The first VOQ length information of each aggregation switch includes a quantity of data packets buffered in the M-1 VOQs in the aggregation switch. In other words, the first VOQ length information is used to indicate a quantity of data packets that are buffered in the aggregation switch in a current timeslot and that need to be sent from the first pod to each of the M-1 second pods.

For example, if three data packets are buffered in the $VOQ_{1112}$, five data packets are buffered in the $VOQ_{1113}$, and eight data packets are buffered in the $VOQ_{1114}$ in the aggregation switch 11, first VOQ length information (which is referred to as first VOQ length information 11 below) of the aggregation switch 11 is used to indicate that in the aggregation switch 11 in a current timeslot, three buffered data packets need to be sent from the pod 1 to the pod 2, five buffered data packets need to be sent from the pod 1 to the pod 3, and eight buffered data packets need to be sent from the pod 1 to the pod 4. The first VOQ length information 11 may be shown in Table 1.

TABLE 1

| | Pod 1 | Pod 2 | Pod 3 | Pod 4 |
|---|---|---|---|---|
| Aggregation switch 11 | | 3 | 5 | 8 |

If one data packet is buffered in the $VOQ_{1212}$, three data packets are buffered in the $VOQ_{1213}$, and four data packets are buffered in the $VOQ_{1214}$ in the aggregation switch 12, first VOQ length information (which is referred to as first VOQ length information 12 below) of the aggregation switch 12 is used to indicate that in the aggregation switch 12 in a current timeslot, one buffered data packet needs to be sent from the pod 1 to the pod 2, three buffered data packets need to be sent from the pod 1 to the pod 3, and four buffered data packets need to be sent from the pod 1 to the pod 4. The first VOQ length information 12 may be shown in Table 2.

TABLE 2

|  | Pod 1 | Pod 2 | Pod 3 | Pod 4 |
|---|---|---|---|---|
| Aggregation switch 12 |  | 1 | 3 | 4 |

In operation 404, each aggregation switch sends the first VOQ length information to the scheduling platform.

In operation 405, the scheduling platform aggregates all the received first VOQ length information in each timeslot, to obtain global VOQ length information.

The global VOQ length information includes a total quantity of data packets that need to be sent from each of the M pods to other pods than the pod in the M pods in a current timeslot.

In an example, the scheduling platform may first aggregate first VOQ length information of aggregation switches in each pod, to obtain M pieces of second VOQ length information that are in a one-to-one correspondence with the M pods. The second VOQ length information includes a total quantity of data packets that are buffered in all aggregation switches in a corresponding pod in a current timeslot and that need to be sent from the corresponding pod to other pods than the corresponding pod in the M pods. Then the scheduling platform aggregates the M pieces of second VOQ length information, to obtain the global VOQ length information.

For example, each aggregation switch in each pod may send first VOQ length information of the aggregation switch to a corresponding pod controller. The pod controller aggregates first VOQ length information of all aggregation switches in a pod to which the pod controller belongs, to obtain second VOQ length information corresponding to the pod to which the pod controller belongs.

For example, the aggregation switch 11 and the aggregation switch 12 in the pod 1 send the first VOQ length information 11 and the first VOQ length information 12 to the pod controller 1. The pod controller 1 adds a quantity of data packets that need to be sent from the pod 1 to the pod 2 in the first VOQ length information 11 and a quantity of data packets that need to be sent from the pod 1 to the pod 2 in the first VOQ length information 12 (in other words, adds a quantity of data packets buffered in the $VOQ_{1112}$ a quantity of data packets buffered in the $VOQ_{1212}$), to obtain four (3+1=4) data packets that are buffered in the aggregation switch 11 and the aggregation switch 12 and that need to be sent from the pod 1 to the pod 2. The pod controller 1 adds a quantity of data packets that need to be sent from the pod 1 to the pod 3 in the first VOQ length information 11 and a quantity of data packets that need to be sent from the pod 1 to the pod 3 in the first VOQ length information 12 (in other words, adds a quantity of data packets buffered in the $VOQ_{1113}$ and a quantity of data packets buffered in the $VOQ_{1213}$), to obtain eight (5+3=8) data packets that are buffered in the aggregation switch 11 and the aggregation switch 12 and that need to be sent from the pod 1 to the pod 3. The pod controller 1 adds a quantity of data packets that need to be sent from the pod 1 to the pod 4 in the first VOQ length information 11 and a quantity of data packets that need to be sent from the pod 1 to the pod 4 in the first VOQ length information 12 (in other words, adds a quantity of data packets buffered in the $VOQ_{1114}$ and a quantity of data packets buffered in the $VOQ_{1214}$), to obtain 12 (8+4=12) data packets that are buffered in the aggregation switch 11 and the aggregation switch 12 and that need to be sent from the pod 1 to the pod 4. Therefore, the pod controller 1 obtains second VOQ length information (which is referred to as second VOQ length information 1 below) corresponding to the pod 1. Then the pod controller 1 sends the second VOQ length information 1 to a centralized controller. The second VOQ length information 1 may be shown in Table 3.

TABLE 3

|  | Pod 1 | Pod 2 | Pod 3 | Pod 4 |
|---|---|---|---|---|
| Pod 1 |  | 4 | 8 | 12 |

Similarly, the pod controller 2 in the pod 2 receives and aggregates first VOQ length information sent by the aggregation switch 21 and the aggregation switch 22 in the pod 2, to obtain second VOQ length information (which is referred to as second VOQ length information 2 below) corresponding to the pod 2. It is assumed that the second VOQ length information 2 includes that in the aggregation switch 21 and the aggregation switch 22, five buffered data packets need to be sent from the pod 2 to the pod 1, nine buffered data packets need to be sent from the pod 2 to the pod 3, and six buffered data packets need to be sent from the pod 2 to the pod 4. Then the pod controller 2 sends the second VOQ length information 2 to the centralized controller. The second VOQ length information 2 may be shown in Table 4.

TABLE 4

|  | Pod 1 | Pod 2 | Pod 3 | Pod 4 |
|---|---|---|---|---|
| Pod 2 | 5 |  | 9 | 6 |

The pod controller 3 in the pod 3 receives and aggregates first VOQ length information sent by the aggregation switch 31 and the aggregation switch 32 in the pod 3, to obtain second VOQ length information (which is referred to as second VOQ length information 3 below) corresponding to the pod 3. It is assumed that the second VOQ length information 3 includes that in the aggregation switch 31 and the aggregation switch 32, 13 buffered data packets need to be sent from the pod 3 to the pod 1, seven buffered data packets need to be sent from the pod 3 to the pod 2, and 10 buffered data packets need to be sent from the pod 3 to the pod 4. Then the pod controller 3 sends the second VOQ length information 3 to the centralized controller. The second VOQ length information 3 may be shown in Table 5.

TABLE 5

|  | Pod 1 | Pod 2 | Pod 3 | Pod 4 |
|---|---|---|---|---|
| Pod 3 | 13 | 7 |  | 10 |

The pod controller 4 in the pod 4 receives and aggregates first VOQ length information sent by the aggregation switch 41 and the aggregation switch 42 in the pod 4, to obtain second VOQ length information (which is referred to as second VOQ length information 4 below) corresponding to the pod 4. It is assumed that the second VOQ length information 4 includes that in the aggregation switch 41 and the aggregation switch 42, three buffered data packets need to be sent from the pod 4 to the pod 1, 10 buffered data packets need to be sent from the pod 4 to the pod 2, and seven buffered data packets need to be sent from the pod 4 to the pod 3. Then the pod controller 4 sends the second VOQ length information 4 to the centralized controller. The second VOQ length information 4 may be shown in Table 6.

TABLE 6

|  | Pod 1 | Pod 2 | Pod 3 | Pod 4 |
|---|---|---|---|---|
| Pod 4 | 3 | 10 | 7 |  |

After receiving the second VOQ length information 1, the second VOQ length information 2, the second VOQ length information 3, and the second VOQ length information 4, the centralized controller combines the second VOQ length information 1, the second VOQ length information 2, the second VOQ length information 3, and the second VOQ length information 4, to obtain global VOQ length information. The global VOQ length information may be shown in Table 7.

TABLE 7

|  | Pod 1 | Pod 2 | Pod 3 | Pod 4 |
|---|---|---|---|---|
| Pod 1 |  | 4 | 8 | 12 |
| Pod 2 | 5 |  | 9 | 6 |
| Pod 3 | 13 | 7 |  | 10 |
| Pod 4 | 3 | 10 | 7 |  |

In operation 406, the scheduling platform determines a transmission matching scheme based on the global VOQ length information.

The transmission matching scheme is used to instruct each pod to: send a data packet to one of the M pods except the pod and receive a data packet sent by one of the M pods except the pod.

For example, the scheduling platform may determine a plurality of transmission matching schemes based on the global VOQ length information shown in Table 7. For example, the determined transmission matching scheme may be ((1, 4), (2, 3), (3, 1), (4, 2)). (1, 4) indicates that the pod 1 sends a data packet to the pod 4 in a timeslot (in a current timeslot or a next timeslot of a current timeslot) corresponding to the transmission matching scheme. Similarly, (2, 3) indicates that the pod 2 sends a data packet to the pod 3 in a timeslot corresponding to the transmission matching scheme. (3, 1) indicates that the pod 3 sends a data packet to the pod 1 in a timeslot corresponding to the transmission matching scheme. (4, 2) indicates that the pod 4 sends a data packet to the pod 2 in a timeslot corresponding to the transmission matching scheme.

Alternatively, the transmission matching scheme may be ((1, 2), (2, 1), (3, 4), (4, 3)). To be specific, ((1, 2), (2, 1), (3, 4), (4, 3)) indicates that the pod 1 sends a data packet to the pod 2, the pod 2 sends a data packet to the pod 1, the pod 3 sends a data packet to the pod 4, and the pod 4 sends a data packet to the pod 3 in a timeslot corresponding to the transmission matching scheme.

The scheduling platform may randomly determine a transmission matching scheme, to instruct each pod to: send a data packet to one of the M pods except the pod and receive a data packet sent by one of the M pods except the pod. In other words, the scheduling platform may randomly determine a transmission matching scheme that ensures that each pod can receive a data packet from only one pod and send a data packet to only one pod in a corresponding timeslot.

It should be noted that, by using the transmission matching scheme, it may be ensured that an aggregation switch in each pod receives data from only one pod in each timeslot, thereby reducing downlink conflicts, and implementing non-blocking downlink transmission from the core switch to the aggregation switch.

In one embodiment, in this application, the scheduling platform may alternatively determine a finally used transmission matching scheme by using a maximum weighted matching algorithm for a weighted bipartite graph. In other words, the scheduling platform may first convert the global VOQ length information into weighted bipartite graph information.

Figure 5:
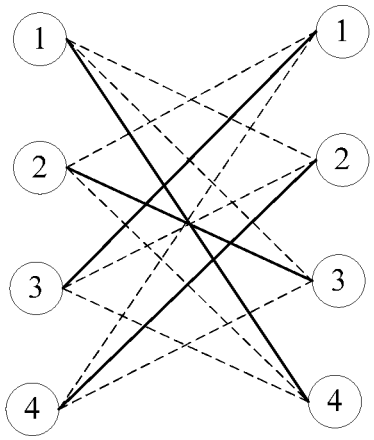
FIG. 5 is a schematic diagram of a weighted bipartite graph according to this application.

For example, a weighted bipartite graph shown in FIG. 5 may be obtained based on the global VOQ length information shown in Table 7. Each vertex indicates one pod, for example, ① indicates the pod 1, ② indicates the pod 2, ③ indicates the pod 3, and ④ indicates the pod 4. A weight value is assigned to a connection line (including a solid line and a dashed line) between pods, and the weight value indicates a queue length of a corresponding VOQ. A longer queue length of a VOQ (in other words, a larger quantity of data packets buffered in the VOQ) indicates a larger weight value of the queue length of the VOQ. If it is assumed that a quantity of data packets is used as a weight value of a queue length of a VOQ, an solid line between ① and ④ indicates that a weight value of a queue length of a VOQ of a data packet that needs to be sent from the pod 1 to the pod 4 is 12; an solid line between ② and ③ indicates that a weight value of a queue length of a VOQ of a data packet that needs to be sent from the pod 2 to the pod 3 is 9; a dashed line between ② and ④ indicates that a weight value of a queue length of a VOQ of a data packet that needs to be sent from the pod 2 to the pod 4 is 6, and the like.

Then, the scheduling platform may obtain, through calculation by using the maximum weighted matching algorithm, a transmission matching scheme with a maximum sum of weight values of queue lengths of VOQs in the plurality of transmission matching schemes, in other words, an optimal transmission matching scheme.

For example, as shown in FIG. 5, solid lines between pods indicate a transmission matching scheme with a maximum sum of weight values of queue lengths of VOQs. To be specific, the determined transmission matching scheme with the maximum weight value is ((1, 4), (2, 3), (3, 1), (4, 2)), and the weight value of the transmission matching scheme is 12+9+13+10=44.

It should be noted that a transmission matching scheme can be adjusted in real time based on an overstocking status of a data packet by using a maximum weighted matching algorithm for a weighted bipartite graph, so as to more properly allocate link resources, thereby effectively improving network bandwidth usage and reducing an intra-network delay.

It may be understood that after obtaining the global VOQ length information, the centralized controller may determine the transmission matching scheme based on the global VOQ length information.

Operation 407: The scheduling platform sends corresponding matching result information to each aggregation switch according to the transmission matching scheme.

In this application, matching result information corresponding to all aggregation switches may be the same. To be specific, the scheduling platform may generate, according to the transmission matching scheme, one piece of matching result information describing the transmission matching scheme, and then send the matching result information to all the aggregation switches, so that each aggregation switch sends a data packet according to the transmission matching scheme.

In one embodiment, matching result information corresponding to all aggregation switches may be different. To be specific, the scheduling platform may generate, according to the transmission matching scheme, different pieces of matching result information corresponding to all the aggregation switches.

It may be understood that, for each aggregation switch, the aggregation switch may determine, based on the matching result information, to send a first data packet. The first data packet is a data packet that needs to be sent from the first pod to a third pod, and the third pod is one of the other pods.

For example, based on the optimal transmission matching scheme ((1, 4), (2, 3), (3, 1), (4, 2)), The centralized controller may generate, according to the transmission matching scheme, matching information corresponding to each pod, for example, information (1, 4) corresponding to the pod 1, information (2, 3) corresponding to the pod 2, information (3, 1) corresponding to the pod 3, and information (4, 2) corresponding to the pod 4.

Then the centralized controller sends the matching information corresponding to each pod to each pod controller. The pod controller 1 generates, based on the information (1,4), matching result information corresponding to the aggregation switch 11 and the aggregation switch 12. For example, the pod controller 1 generates information "1114" and "1214" based on the information (1, 4). The pod controller 1 sends "1114" to the aggregation switch 11, so that the aggregation switch sends a data packet buffered in the $VOQ_{1114}$. The pod controller 1 sends "1214" to the aggregation switch 12, so that the aggregation switch sends a data packet buffered in the $VOQ_{1214}$. Therefore, for the aggregation switch 11 and the aggregation switch 12, it may be determined, based on the matching result information, that the first data packet that needs to be sent is a data packet sent from the pod 1 to the pod 4, the first pod is the pod 1, and the third pod is the pod 4.

In operation 408, each aggregation switch sends a data packet based on the received matching result information.

In an example, the aggregation switch is connected to n/2 (n≥2, and n is an integer) core switches, and a quantity of first data packets is N (N≥0, and N is an integer). Therefore, when N≤n/2, the aggregation switch may simultaneously send the N first data packets in a current timeslot (to be specific, a timeslot in which the matching result information is received) or a next timeslot based on the matching result information.

When N≥n/2, the aggregation switch may simultaneously send n/2 of the first data packets in a current timeslot or a next timeslot based on the matching result information.

It may be learned from the foregoing embodiment that according to the dynamic scheduling method provided in this application, the scheduling platform only needs to collect, in each timeslot, a quantity of data packets that are buffered in an aggregation switch in each pod and that need to be sent from the pod to another pod, and then determine a transmission matching scheme in which each pod can send a data packet to one of the M pods except the pod and receive a data packet sent by one of the M pods except the pod. Because one pod may be connected to a plurality of hosts, compared with a prior-art solution of collecting data request information of each host and calculating host-to-host transmission pairing and global route allocation, the dynamic scheduling method provided in this application can greatly reduce information exchange costs and calculation complexity of data scheduling and route allocation.

The solutions provided by this application are described above mainly from a perspective of interaction between the network elements. It can be understood that the network elements, such as the scheduling platform and the aggregation switch, include corresponding hardware structures and/or software modules for performing the functions, to implement the foregoing functions. A person skilled in the art should be easily aware that units and algorithm operations in the examples described with reference to the embodiments disclosed in this specification may be implemented in a form of hardware or in a form of a combination of hardware and computer software in this application. Whether a function is implemented by hardware or by computer software driving hardware depends on a particular application and a design constraint condition of the technical solution. A person skilled in the art may use different methods to implement the described functions for each particular application, but it should not be considered that the implementation goes beyond the scope of this application.

In this application, the scheduling platform and the aggregation switch may be divided into function modules based on the foregoing method examples. For example, each function module may be obtained through division for a corresponding function, or two or more functions may be integrated into one processing module. The integrated module may be implemented in a form of hardware, or may be implemented in a form of a functional module of software. It should be noted that, division of modules in this application is merely an example, and is only division of logical functions. Other division manners may be available in actual implementations.

Figure 6A:
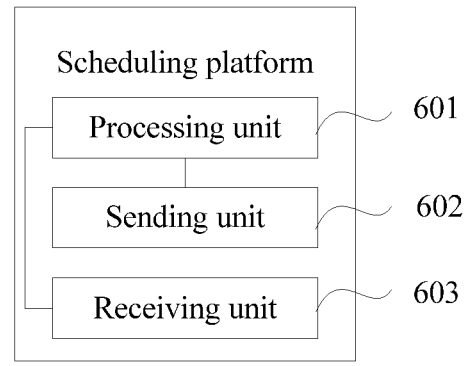
FIG. 6A is a second schematic structural diagram of a scheduling platform according to this application.

When each function module is obtained through division for each corresponding function, FIG. 6A is a schematic structural diagram of the scheduling platform in the foregoing embodiments. The scheduling platform includes a receiving unit 601, a sending unit 602, and a processing unit 603. The processing unit 601 is configured to support the scheduling platform in performing operations 405 to 407 in FIG. 4. The sending unit 602 is configured to support the scheduling platform in performing operation 408 in FIG. 4. The receiving unit 603 is configured to support the scheduling platform in performing operation 404 in FIG. 4. All related content of each operation in the foregoing method embodiment may be cited in function descriptions of a corresponding function module. Details are not described herein again.

Figure 6B:
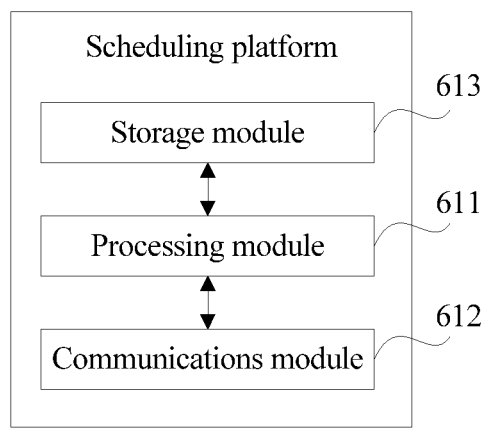
FIG. 6B is a third schematic structural diagram of a scheduling platform according to this application.

When an integrated unit is used, FIG. 6B is a schematic structural diagram of the scheduling platform in the foregoing embodiments. The scheduling platform includes a processing module 611 and a communications module 612. The processing module 611 is configured to control and manage an action of the scheduling platform. For example, the processing module 611 is configured to support the scheduling platform in performing operations 404 to 408 in FIG. 4 and/or another process of the technology described in this specification. The communications module 612 is configured to support the scheduling platform in communicating with another network entity, for example, communicating with a function module or a network entity shown in FIG. 1B. The scheduling platform may further include a storage module 613, configured to store program code and data of the scheduling platform.

The processing module 611 may be a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module 611 may implement or execute various example logical blocks, modules, and circuits described with reference to content disclosed in this application. The processor may be a combination for implementing a computing function, for example, a combination of one or more microprocessors or a combination of a DSP and a microprocessor. The communications module 612 may be a transceiver, a transceiver circuit, a communications interface, or the like. The storage module 613 may be a memory.

Figure 6C:
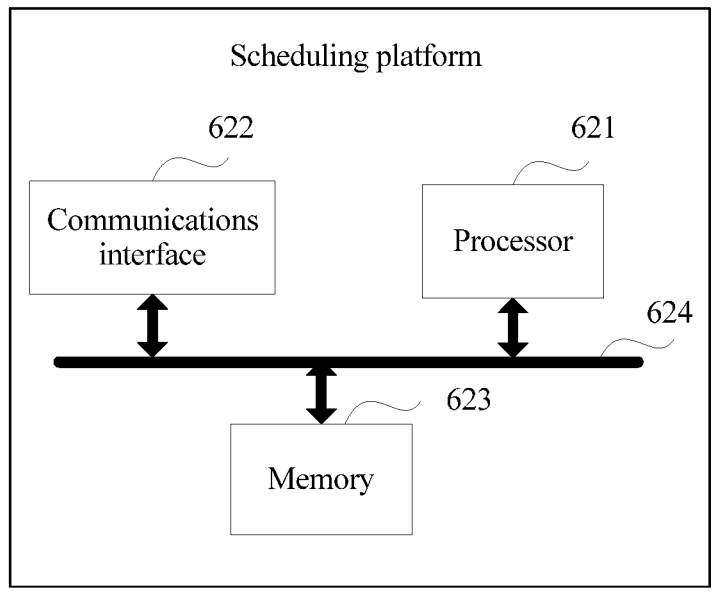
FIG. 6C is a fourth schematic structural diagram of a scheduling platform according to this application.

When the processing module 611 is a processor, the communications module 612 is a communications interface, and the storage module 613 is a memory, the scheduling platform in this application may be a scheduling platform shown in FIG. 6C.

Referring to FIG. 6C, the scheduling platform includes: a processor 621, a communications interface 622, a memory 623, and a bus 624. The communications interface 622, the processor 621, and the memory 623 are interconnected by using the bus 624. The bus 624 may be a peripheral component interconnect (PCI) bus, an extended industry standard architecture (EISA) bus, or the like. The bus may be classified into an address bus, a data bus, a control bus, and the like. For ease of representation, the bus is represented by using only one thick line in FIG. 6C, but it does not indicate that there is only one bus or one type of bus.

Figure 7A:
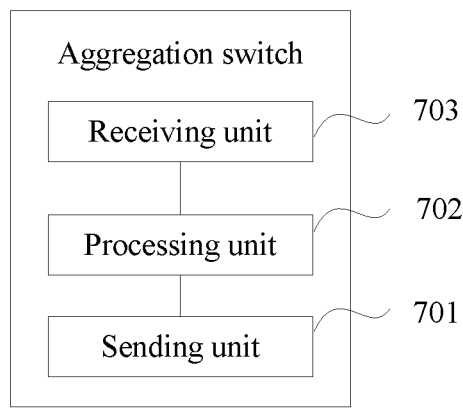
FIG. 7A is a second schematic structural diagram of an aggregation switch according to this application.

When each function module is obtained through division for each corresponding function, FIG. 7A is a schematic structural diagram of the aggregation switch in the foregoing embodiments. The aggregation switch includes a sending unit 701, a processing unit 702, and a receiving unit 703. The sending unit 701 is configured to support the aggregation switch in performing operations 404 and 408 in FIG. 4. The processing unit 702 is configured to support the aggregation switch in performing operation 403 in FIG. 4. The receiving unit 703 is configured to support the aggregation switch in performing operations 402 and 407 in FIG. 4. All related content of each operation in the foregoing method embodiment may be cited in function descriptions of a corresponding function module. Details are not described herein again.

Figure 7B:
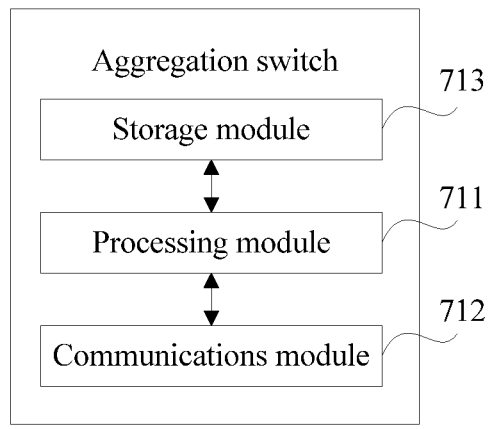
FIG. 7B is a third schematic structural diagram of an aggregation switch according to this application.

When an integrated unit is used, FIG. 7B is a schematic structural diagram of the aggregation switch in the foregoing embodiments. The aggregation switch includes a processing module 711 and a communications module 712. The processing module 711 is configured to control and manage an action of the aggregation switch. For example, the processing module 711 is configured to support the aggregation switch in performing operations 402, 403, 407, and 408 in FIG. 4 and/or another process of the technology described in this specification. The communications module 712 is configured to support the aggregation switch in communicating with another network entity, for example, communicating with a function module or a network entity shown in FIG. 1B. The aggregation switch may further include a storage unit 713, configured to store program code and data of the aggregation switch.

The processing module 711 may be a processor or a controller, for example, may be a CPU, a general-purpose processor, a DSP, an ASIC, an FPGA or another programmable logic device, a transistor logic device, a hardware component, or any combination thereof. The processing module 711 may implement or execute various example logical blocks, modules, and circuits described with reference to content disclosed in this application. The processor may be a combination for implementing a computing function, for example, a combination of one or more microprocessors or a combination of a DSP and a microprocessor. The communications module 712 may be a transceiver, a transceiver circuit, a communications interface, or the like. The storage module 713 may be a memory.

Figure 7C:
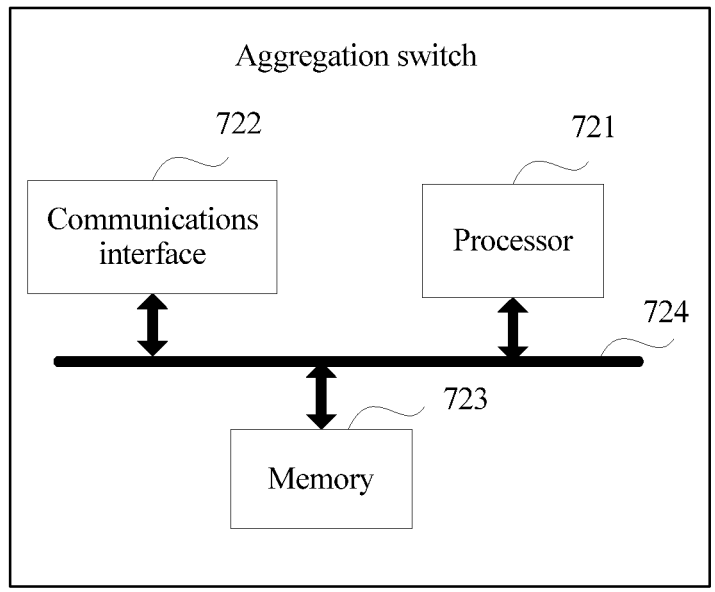
FIG. 7C is a fourth schematic structural diagram of an aggregation switch according to this application.

When the processing module 711 is a processor, the communications module 712 is a communications interface, and the storage module 713 is a memory, the aggregation switch in this application may be an aggregation switch shown in FIG. 7C.

Referring to FIG. 7C, the aggregation switch includes: a processor 721, a communications interface 722, a memory 723, and a bus 724. The communications interface 722, the processor 721, and the memory 723 are interconnected by using the bus 724. The bus 724 may be a PCI bus, an EISA bus, or the like. The bus may be classified into an address bus, a data bus, a control bus, and the like. For ease of representation, the bus is represented by using only one thick line in FIG. 7C, but it does not indicate that there is only one bus or one type of bus.

The methods or algorithm operations described with reference to the content disclosed in this application may be implemented in a hardware manner, or may be implemented by a processor executing a software instruction. The software instruction may include a corresponding software module. The software module may be stored in a random access memory RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. An example storage medium is coupled to the processor, so that the processor can read information from the storage medium, and can write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

In specific implementation, an embodiment of the present invention further provides a computer storage medium. The computer storage medium may store a program, and when the program is executed, some or all operations of the embodiments of the dynamic scheduling method provided in the present invention may be performed. The storage medium may be a magnetic disk, an optical disc, a read-only memory (ROM), a random access memory (RAM), or the like.

A person skilled in the art may clearly understand that, the technologies in this application may be implemented by software in addition to a necessary general hardware platform. Based on such an understanding, the technical solutions of this application essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, a VPN network gateway, or the like) to perform the methods described in the embodiments or some parts of the embodiments of the present invention.

For same or similar parts in the embodiments in this specification, mutual reference may be made to each other. Especially, the apparatus embodiment is basically similar to a method embodiment, and therefore is described briefly. For related parts, refer to descriptions in the method embodiment.

The foregoing implementations of the present invention do not constitute a limitation on the protection scope of the present invention.

What is claimed is:

1. A dynamic scheduling method, comprising:
    receiving, by a scheduling platform, first virtual output queue (VOQ) length information of each aggregation switch in each timeslot, wherein the first VOQ length information comprises a quantity of data packets buffered in M-1 VOQs in the aggregation switch, wherein each of the M-1 VOQs is used to buffer a data packet that needs to be sent from a first cluster pod to one of M-1 second pods, wherein the first cluster pod is a pod to which the aggregation switch belongs, wherein the M-1 second pods are other pods than the first cluster pod in M pods managed by the scheduling platform, wherein M is equal to or greater than 2, and wherein M is an integer;
    aggregating, by the scheduling platform, the received first VOQ length information to obtain global VOQ length information, wherein the global VOQ length information comprises a total quantity of data packets that need to be sent from each of the M pods to other pods than the pod in the M pods;
    determining, by the scheduling platform, a transmission matching scheme based on the global VOQ length information, wherein the determining of the transmission matching scheme includes converting the global VOQ length information into a weighted graph, and obtaining the transmission matching scheme from the weighted graph using a weighted matching algorithm, wherein the transmission matching scheme is used to instruct each pod to send a data packet to one of the M pods except the pod and receive a data packet sent by one of the M pods except the pod; and
    sending, by the scheduling platform, corresponding matching result information to each aggregation switch according to the transmission matching scheme, so that each aggregation switch sends a data packet according to the transmission matching scheme.

2. The method according to claim 1, wherein the aggregating, by the scheduling platform, of the received first VOQ length information, to obtain the global VOQ length information comprises:
    aggregating, by the scheduling platform, first VOQ length information of aggregation switches in each pod, to obtain M pieces of second VOQ length information that are in a one-to-one correspondence with the M pods, wherein the second VOQ length information comprises a total quantity of data packets that are buffered in all aggregation switches in a corresponding pod in a current timeslot and that need to be sent from the corresponding pod to other pods than the corresponding pod in the M pods; and
    aggregating, by the scheduling platform, the M pieces of second VOQ length information, to obtain the global VOQ length information.

3. The method according to claim 1, wherein
    the weighted graph is a weighted bipartite graph, and wherein the weighted matching algorithm is a maximum weighted matching algorithm.

4. The method according to claim 1, wherein the sending, by the scheduling platform, of corresponding matching result information to each aggregation switch according to the transmission matching scheme comprises:
    generating, by the scheduling platform according to the transmission matching scheme, the matching result information corresponding to each aggregation switch; and
    sending, by the scheduling platform, the corresponding matching result information to each aggregation switch.

5. A scheduling method, comprising:
    determining, by an aggregation switch, first virtual output queue (VOQ) length information in each timeslot, wherein the aggregation switch is connected to n/2 core switches, wherein n is equal to or grater than 2, where n is an integer, wherein the first VOQ length information comprises a quantity of data packets buffered in M-1 VOQs in the aggregation switch, wherein each of the M-1 VOQs is used to buffer a data packet that needs to be sent from a first cluster pod to one of M-1 second pods, wherein the first cluster pod is a pod to which the aggregation switch belongs, wherein the M-1 second pods are other pods than the first pod in M pods managed by a scheduling platform, wherein M is equal to or greater than 2, and wherein M is an integer;
    sending, by the aggregation switch, the first VOQ length information to the scheduling platform;
    receiving, by the aggregation switch, matching result information sent by the scheduling platform, wherein the matching result information is used to instruct to send a first data packet, wherein the first data packet is a data packet that needs to be sent from the first pod to a third pod, and wherein the third pod is one of the other pods; and
    sending, by the aggregation switch, the first data packet based on the matching result information.

6. The method according to claim 5, wherein a quantity of first data packets is N, and wherein the sending, by the aggregation switch, of the first data packet based on the matching result information comprises:
    when N is equal to or smaller than n/2, simultaneously sending, by the aggregation switch, the N first data packets in a current timeslot based on the matching result information; or
    when N is equal to or greater than n/2, simultaneously sending, by the aggregation switch, n/2 of the first data packets in a current timeslot based on the matching result information.

7. The method according to claim 5, wherein a quantity of first data packets is N, and wherein the sending, by the aggregation switch, of the first data packet based on the matching result information comprises:
    when N is equal to or smaller than n/2, simultaneously sending, by the aggregation switch, the N first data packets in a next timeslot based on the matching result information; or when N is equal to or greater than n/2, simultaneously sending, by the aggregation switch, n/2 of the first data packets in a next timeslot based on the matching result information.

8. A scheduling platform, comprising:
a communications interface, configured to receive first virtual output queue (VOQ) length information of each aggregation switch in each timeslot, wherein the first VOQ length information comprises a quantity of data packets buffered in M-1 VOQs in the aggregation switch, wherein each of the M-1 VOQs is used to buffer a data packet that needs to be sent from a first cluster pod to one of M-1 second pods, wherein the first cluster pod is a pod to which the aggregation switch belongs, wherein the M-1 second pods are other pods than the first pod in M pods managed by the scheduling platform, wherein M is equal to or greater than 2, and wherein M is an integer;
a processor, configured to aggregate the first VOQ length information received by a receiving unit to obtain global VOQ length information, wherein the global VOQ length information comprises a total quantity of data packets that need to be sent from each of the M pods to other pods than the pod in the M pods;
wherein the processor is further configured to determine a transmission matching scheme based on the global VOQ length information, wherein the transmission matching scheme includes is determined by converting the global VOQ length information into a weighted graph, and obtaining the transmission matching scheme from the weighted graph using a weighted matching algorithm, wherein the transmission matching scheme is used to instruct each pod to send a data packet to one of the M pods except the pod and receive a data packet sent by one of the M pods except the pod; and
wherein the communication interface is configured to send corresponding matching result information to each aggregation switch according to the transmission matching scheme determined by the processor, so that each aggregation switch sends a data packet according to the transmission matching scheme.

9. The scheduling platform according to claim 8, wherein the processor comprises a first processing module and M second processing modules that are in a one-to-one correspondence with the M pods;
wherein aggregating, by the processor, the received first VOQ length information to obtain global VOQ length information comprises:
aggregating, by each of the M second processing modules, first VOQ length information of all aggregation switches in a corresponding pod to obtain second VOQ length information, and send the second VOQ length information to the first processing module, wherein the second VOQ length information comprises a total quantity of data packets that are buffered in all the aggregation switches in a current timeslot and that need to be sent from the corresponding pod to other pods than the corresponding pod in the M pods; and
aggregating, by the first processing module, M pieces of second VOQ length information obtained by the M second processing modules to obtain the global VOQ length information.

10. The scheduling platform according to claim 9, wherein the
weighted graph is a weighted bipartite graph, and wherein the
weighted matching algorithm is a maximum weighted matching algorithm.

11. The scheduling platform according to claim 9, wherein the communication interface is configured to:
generate, according to the transmission matching scheme, the matching result information corresponding to each aggregation switch; and
send the corresponding matching result information to each aggregation switch.

* * * * *